Oct. 31, 1944.   L. C. HUCK   2,361,771
MANUFACTURE OF RIVETS
Filed May 28, 1943
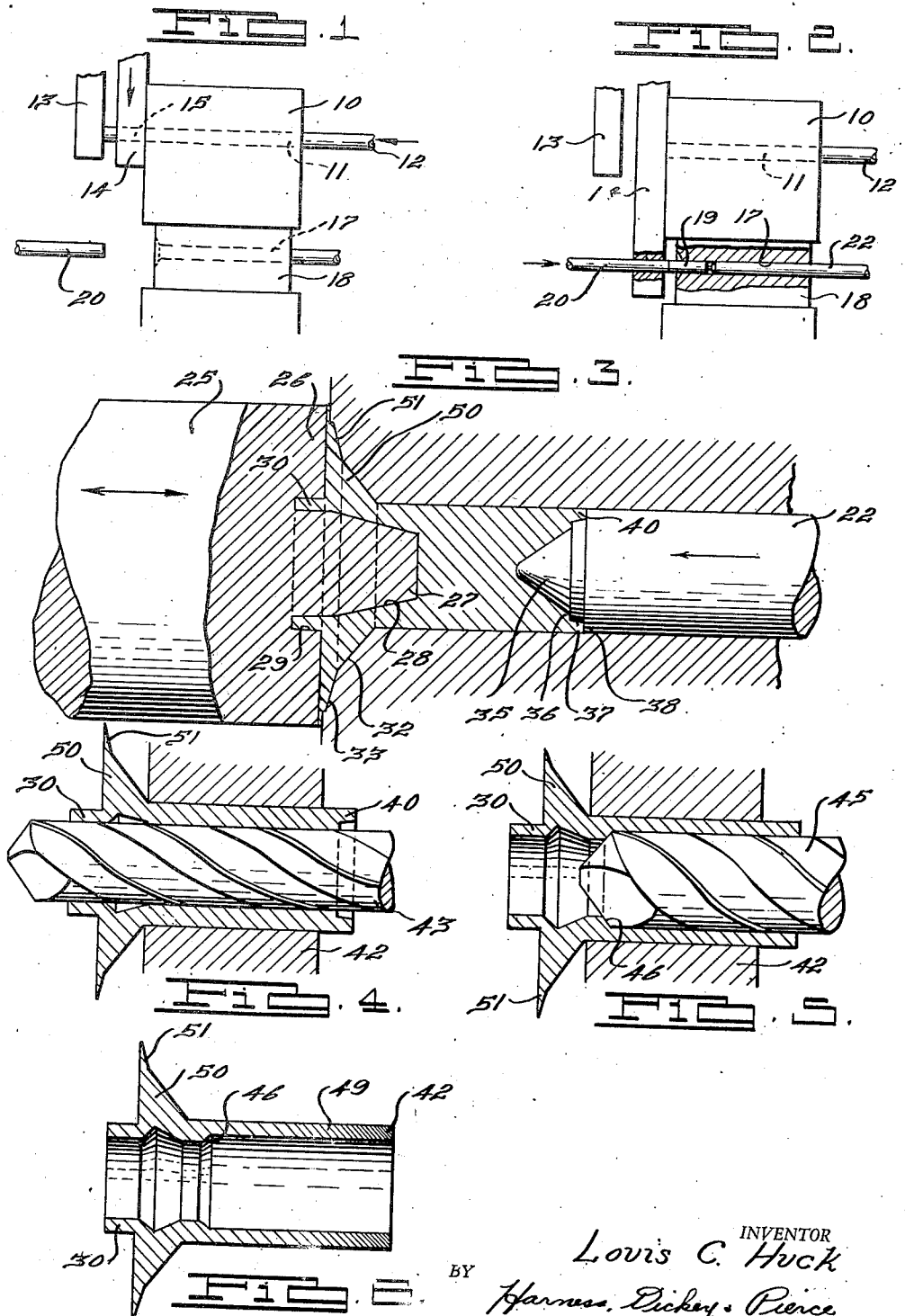
INVENTOR
Louis C. Huck
BY Harness, Dickey & Pierce
ATTORNEYS Patented Oct. 31, 1944

2,361,771

UNITED STATES PATENT OFFICE 2,361,771

MANUFACTURE OF RIVETS

Louis C. Huck, Grosse Pointe Shores, Mich., assignor, by mesne assignments, to Huxon Holding Corporation, Detroit, Mich., a corporation of Michigan Application May 28, 1943, Serial No. 488,843

6 Claims. (Cl. 10—27)

The invention generally relates to rivets and it has particular relation to an apparatus for and method of manufacturing rivets.

Specifically, the invention is concerned with the manufacture of a tubular rivet element forming one part of a two-part rivet, such as embodied in my copending application for patent, Serial No. 454,211, filed August 10, 1942. In that application for patent, the tubular member has an annular wall portion at the end opposite its head, which is outwardly expanded so as to form an annular, bulbed head during the rivet setting operation. This head is formed by applying axial forces to the outer end of such annular portion by pulling the pin or other rivet part and applying the reaction forces to the preformed head on the tubular part. In order to more definitely assure and also control the bulbing of the annular wall, the outer end of the latter is strainhardened or cold worked so as to increase its resistance to expansion and this strainhardening is progressively decreased inwardly from the end of the annular wall portion. In a special sense, the present invention is concerned with the manufacture of a tubular element having strainhardened and cold worked sections of this character.

An object of the invention is to provide a method of manufacturing a tubular member such as designated which will enable obtaining the cold worked or strainhardened features economically and uniformly so that the tubular element may be produced inexpensively.

Another object of the invention is to provide a method of obtaining these results in a rapid manner so as to facilitate high speed production.

Another object of the invention is to provide an apparatus for effecting the strainhardening or cold working of the tubular element economically, rapidly, and uniformly.

And in general it is an object of the invention to provide a method of and apparatus for producing a tubular rivet element on the order of that designated above which will enable producing the element from a wire or rod by means of rapid and accurate operations.

Other objects of the invention will become apparent from the following specification, from the drawing relating thereto, and from the claims hereinafter set forth.

For a better understanding of the invention, reference may be had to the drawing wherein:

Figure 1 is a generally diagrammatic view illustrating apparatus for manufacturing elements according to one form of the invention;

Figure 2 is a view similar to Figure 1 showing another stage in the operations;

Figure 3 is an enlarged and cross-sectional view illustrating a further step in the operation of the apparatus shown by Figures 1 and 2;

Figures 4 and 5 illustrate drilling operations performed on the element in sequential order, and Figure 6 is a cross-sectional view illustrating the the finished product.

Referring to Figures 1 and 2, the apparatus shown includes a frame or support 10 having an opening 11 through which metal wire stock 12 advances. This stock is moved against a stop 13 spaced from one side of the frame and after the stock has moved into engagement with the stop, the length of wire between the frame and stop is cut off. The cutting mechanism includes a knife 14 having an opening 15 through which the wire passes and when the knife is moved transversely to the wire, the blank is cut off, and furthermore is carried with the knife. As shown best by Figure 2, the knife 14 moves to a position where its opening 15 is aligned with an opening 17 provided in a die 18, and upon movement of the wire blank indicated at 19 to a position where it is aligned with the opening 17 in the die, a punch or pin 20 advances and moves the blank out of the knife opening and into the end of the die opening.

The blank is advanced into the opening 17 a distance governed by a knock-out punch 22 and this punch is so positioned that a substantial length of the blank will be left projecting from the end of the die opening so as to provide metal for forming a head on the blank. After insertion of the blank into the opening 17, the element 20 is withdrawn, the knife 14 is retracted, and a heading punch 25 for forming the head on the element moves against the projecting end of the blank.

The present invention is not particularly concerned with the shape of the head formed by the heading punch nor is it concerned with the formation of an integral collar on the head and the radial contraction of this collar to a smaller diameter. With respect to these features and others not claimed in the present application, reference may be had to applicant's copending application for patent entitled "Manufacture of rivet element," Serial No. 488,842, filed May 28, 1943, and incorporating in there the same figures, Nos. 1, 2, and 3, as are embodied in the present case. General reference will be made, however, to the heading punch since it cooperates with the portion 22.

Referring to Figure 3, the heading punch includes a rim or outer portion 26 adapted to form a corresponding flat-faced portion on the head of the rivet. A central and projecting portion 27 is adapted to press into the end of the blank and form an inclined or conical opening 28 which extends partially through the blank in an axial direction and an annular recess 29 between the projection 27 and the outer rim portion of the punch allows metal in the blank to extrude axially during the heading operation, so as to form an annular, integral collar 30 on the rivet head.

The die 18 has a frusto-conical recess 32 at the end of the die opening 17 and this frusto-conical recess joins an outer frusto-conical recess 33 which is directed at a small acute angle to the outer face of the die. It will be understood that when the punch 25 moves against the end of the blank 19, the projecting part of the blank is upset so as to form a head having the two frusto-conical under surfaces and a substantially flat or radial outer face, while at the same time the upsetting operation forms the annular collar or rim 30 and a central bore in the blank within the collar.

The knock-out punch 22 has a central, conically shaped projection 35 and the base of this projection joins a narrow, outwardly directed radial shoulder 36 which, in turn, joins a slightly tapered, frusto-conical surface or wall 37. The latter joins an outer radial wall or shoulder 38 extending to the outer surface of the body of the punch. During use of the apparatus, the punch may be held against movement in the opening 17 or may be moved against the end of the blank, but in either case the end of the punch presses into the end of the blank so that a recess is formed in the end of the blank corresponding in shape to the end of the punch. This operation effects considerable strainhardening or cold working of the metal in the blank at the end of the latter so as to increase the strength characteristics of the metal. Around the conical projection 35, the metal is strainhardened or cold worked progressively in an increasing manner from the tip or apex of the projection to the base thereof. Around the surface 37 a rim or end section 40 is formed on the end of the blank which is more uniformly strainhardened with the strainhardening accomplished to a greater extent. The net result of this cold working operation is that the short end section 40 of the blank is strainhardened rather uniformly but to a greater extent while the metal in the blank extending inwardly along the conical projection 35 progressively decreases in strength resulting from cold working.

After the blank is thus upset in an axial direction to form the head on the one end and the strainhardened sections on the other, the punch 25 is withdrawn and then the punch 22 is moved to the left to move the blank out of the die opening. It will be understood that sufficient draft will be provided if necessary on the walls on the punches and projecting portions thereof to allow removal of the blank without undue difficulty.

After the blank is removed, it is placed in a holding member indicated at 42 in Figure 4 and rotated and during rotation, trimming of the outer face of the head and collar and reduction of the collar in diameter are effected as described and shown more particularly in the copending application for patent last identified. Following such operations, a drill 43 forms an opening entirely through the member. Thereafter, the opening is enlarged by means of a drill 45 shown in Figure 5 which enters that end of the blank opposite the head and enlarges the opening to a point adjacent the head. At this point a tapered shoulder 46 is formed by the end of the drill and this shoulder serves as a pin movement limiting means in the setting of the rivet as is explained in the copending application for patent, Serial No. 454,211.

Figure 6 shows the completed article ready to receive the pin part of the rivet. In this figure, the more uniform and stronger cold worked end section is indicated at 42 and the progressively cold worked section is indicated at 49. The main frusto-conical head portion of the element is indicated at 50 and the thinner frusto-conical part or sharp-edged rim is indicated at 51.

It will be understood that tubular rivet elements having other types of heads and other dimensional characteristics may be manufactured in accordance with the present invention and that application of the invention is not limited to a frusto-conical or flush type rivet head. Other types of tubular elements and other types of rivet heads such as embodied in the copending application for patent, Serial No. 488,842, may be used, as will be readily understood, since the strainhardening or cold working characteristics will be useful in different types of tubular elements that are to be expanded during the rivet setting operation.

Although only one form of the invention has been described and illustrated in detail, it will be apparent to tohse skilled in the art that various modifications may be made without departing from the spirit of the invention.

What is claimed is:

1. A punch for forming a recess in the end of a rivet blank comprising a pin element having a conical end, an annular shoulder projecting from and extending around the base of said conical end, and a frusto-conical portion extending axially from the radially outer margin of the shoulder, whereby the punch has two conically inclined surfaces separated by a shoulder.

2. A punch for forming a recess in the end of a rivet blank comprising a pin element having a conical end, an annular shoulder projecting from and extending around the base of said conical end, and a frusto-conical portion extending axially from the radially outer margin of the shoulder, with the cone angles different, whereby the punch has two conically inclined surfaces of different angularity separated by a shoulder.

3. A punch for forming a recess in the end of a rivet blank comprising a pin element having a conical end, an annular shoulder projecting from and extending around the base of said conical end, and a frusto-conical portion extending axially from the radially outer margin of the shoulder, and a second substantially radial, outwardly directed shoulder extending from the outer end of the frusto-conical portion whereby two axially and radially spaced shoulders are provided for limiting movement of the punch into the blank.

4. The method of manufacturing a tubular element which comprises providing a wire or rod blank, placing the blank in a die having an opening therefor so that the outer surface of the blank is substantially held against expansion, axially forcing a punch into one end of the blank with the punch of such shape as to form an annular rim or wall thereon projecting from its outer margin, and to form an annular shoulder at the inner end of said rim and to form a tapered recess or opening radially inward of said shoulder, and then boring an axial opening in said end of the blank of such diameter as to remove the tapered side of said recess and said shoulder while substantially leaving the rim undisturbed.

5. The method of manufacturing a tubular element which comprises providing a wire or rod blank, placing the blank in a die having an opening therefor so that the outer surface of the blank is substantially held against expansion, axially forcing a punch into one end of the blank with the punch of such shape as to form an annular outer marginal rim projecting from the end of the blank and having an axially tapered inner surface, and to form an axially tapered recess in the end of the blank radially inward of the axially inner end of the rim with the inner taper directed at a substantially greater angle to the axis of the blank as compared to the taper on the rim, and then boring an opening in said end of the blank of such size as to substantially remove the inner taper while leaving the rim substantially undisturbed.

6. The method of manufacturing a tubular element which comprises providing a wire or rod blank, placing the blank in a die having an opening therefor so that the outer surface of the blank is substantially held against expansion, axially forcing the punch into one end of the blank with the punch of such shape as to form an annular outer marginal rim projecting from the end of the blank and having an axially tapered inner surface, and to form an axially tapered recess in the end of the blank radially inward of the axially inner end of the rim with the inner taper directed at a substantially greater angle to the axis of the blank as compared to the taper on the rim, and then boring an opening in said end of the blank of such size as to substantially remove both tapered surfaces so as to provide a cylindrical inner surface for the rim.

LOUIS C. HUCK.